United States Patent
Kochi et al.

[19]

[11] Patent Number: 5,930,287
[45] Date of Patent: Jul. 27, 1999

[54] SPREAD-SPECTRUM COMMUNICATION APPARATUS

[75] Inventors: Tetsuya Kochi, Mukoh; Hiroaki Tanaka, Mishima-gun, both of Japan

[73] Assignee: Murata Manufacturing Co., Ltd., Japan

[21] Appl. No.: 08/757,294

[22] Filed: Nov. 27, 1996

[30] Foreign Application Priority Data

Nov. 30, 1995 [JP] Japan ..................................... 7-313218
Oct. 24, 1996 [JP] Japan ..................................... 8-282236

[51] Int. Cl.$^6$ ..................................................... H04B 1/69
[52] U.S. Cl. .............................................................. 375/200
[58] Field of Search ..................................... 375/200, 202, 375/206, 207, 208, 350; 330/8, 10, 47, 63

[56] References Cited

U.S. PATENT DOCUMENTS

| 5,317,289 | 5/1994 | Konishi et al. | 375/350 |
| 5,402,442 | 3/1995 | Ishigaki | 375/200 |
| 5,404,375 | 4/1995 | Kroeger et al. | 375/200 |
| 5,479,442 | 12/1995 | Yamamoto | 375/200 |

FOREIGN PATENT DOCUMENTS 6-44255  6/1994  Japan .

OTHER PUBLICATIONS

IEEE Transactions on Communications, vol. 37, No. 12, Dec. 1989, "Adaptive Narrow–band Interference Rejection in a DS Spread–Spectrum Intercept Receiver Using Transform Domain Signal Processing Techniques" by John Gevargiz et al., pp. 1359–1366.

*Primary Examiner*—Don N. Vo
*Attorney, Agent, or Firm*—Ostrolenk, Faber, Gerb & Soffen, LLP

[57] ABSTRACT

A spread-spectrum communication apparatus includes a receiving antenna, amplifiers, band-pass filters, a threshold filter circuit, a despreader, a base-band demodulation circuit, and other circuit stages. The threshold filter circuit is connected in series before the despreader. The threshold filter circuit has a frequency-band width covering the band width of a spread signal and cuts interference waves at certain levels at each frequency within the frequency band. The threshold filter circuit includes a magnetostatic wave device.

9 Claims, 4 Drawing Sheets

SPREAD-SPECTRUM COMMUNICATION APPARATUS

BACKGROUND OF THE INVENTION

1. Field of the Invention

The present invention relates to a communication apparatus, in particular to a spread-spectrum communication apparatus for use in mobile communications, wireless LAN, or the like.

2. Description of the Related Art

Spread-spectrum techniques expand bandwidth to gain transmission advantages. At a transmitter, pseudorandom spreading distributes the transmitter's power over a much wider frequency range, with much lower power density. Because the spreading is reversed at a receiver, narrow-band interfering signals are spread before demodulation, and wide-band interfering signals remain wide-band. The interference power density in the reconstructed narrow band remains low, while the higher power density of the desired signal is available to the receiver demodulator. Therefore, interference is reduced.

However, as the strength of the interfering signal becomes greater, the S/N ratio will decrease even if a spread spectrum technique is used. In such a case, it is necessary to reduce the power of the interfering signals in advance of despreading.

It may be possible to selectively eliminate the interference by using a band elimination filter (BEF). A programmable band-elimination filter such as an adaptive interference suppressor is often used.

In such case, it is preferable to make the band-width of the filter narrower in comparison with the distributed frequency range to avoid excess elimination of the desired spread signal.

However, as the band-width of the filter decreases, the scanning speed in the process of detecting interference decreases. This reduces the number of interfering signals which can be detected in a unit time.

In a conventional preprocessing technique, interfering signals are first detected utilizing a bandpass filter. Then, the center frequency of the interfering signal is identified. Finally, the interfering signal is eliminated utilizing a band-elimination filter. The foregoing process must be performed for each frequency window being examined.

It is preferable to make the width of the frequency window as narrow as possible because the narrower the window, the smaller the amount of object signal which will be eliminated. Usually, the foregoing steps are carried out by using a digital signal processing technique and the window must scan over a wide frequency range. As a result, when using a narrow window, it will take more time to detect, identify and eliminate the interfering signal. This significantly slows down the detection process.

On the other hand, it may be possible to detect several interference signals in the frequency region in parallel by means of plural band-elimination filters. But, such a method will require a complex signal processing circuit.

In another method, a suppression filter having saturation characteristics in a frequency region is utilized to suppress signals whose power exceeds a predetermined level which is higher than the power level of the desired spread signal. Thereby, the total power of the interference is decreased relative to that of the desired signal.

It is known that a device such as a diode or an amplifier has a saturating characteristic. However, when using such devices, the power of the desired signal is also decreased because such devices have saturating characteristics in the entire frequency region. In other words, the power of the desired signal is also decreased in a frequency region in which no interference appears.

Gevargiz, Das, and Milstein developed techniques for adaptive narrow-band interference rejection in a DS spread-spectrum intercept receiver using transform domain signal processing techniques (IEEE Transactions on Communications, Vol. 37, No.12, December 1989). In that receiver, a chirp filter is used as a suppressor. However, the structure of the chirp filter is relatively complex.

SUMMARY OF THE INVENTION

To solve these problems, the present invention utilizes a magnetostatic wave device as a suppressing filter.

A magnetostatic wave device has a variable frequency region in which it has saturating characteristics in accordance with the strength of a magnetic field applied from the exterior. The device suppresses an input signal having a power level larger than its saturation level. On the other hand, the device presents linear transparency to an input signal whose power level is lower than its saturation level.

Thus, by adjusting a level of a desired spread signal to be under the saturation level, the power of an interference signal can be selectively decreased.

Since a magnetostatic wave device has a simpler structure than that of a chirp filter, it is possible to provide an interference suppressor at low cost.

The present invention provides a spread-spectrum communicating apparatus having an input circuit; a magnetostatic wave device connected to the output of the input circuit; and a despreader connected to the output of the magnetostatic wave device.

The spread-spectrum communicating apparatus may further include an amplifier for amplifying a spread signal received by the input circuit to a level at which an output level of the magnetostatic wave device is saturated, and forwarding the amplified spread signal to the magnetostatic wave device.

And, the spread spectrum communicating apparatus may further include a frequency converter disposed between the magnetostatic wave device and the despreader, for converting the frequency of the signal output from the magnetostatic wave device before the signal is processed in the despreader.

As described above, with the use of the saturation characteristics of an output level against an input level in the magnetostatic filter, constituting a threshold filter, the present invention reduces a plurality of wide-band or narrow-band interference waves mixed into a spread-spectrum signal to a certain level. The energy of the interference waves against that of the spread signal is reduced and the S/N ratio after despreading is improved.

By providing a frequency conversion circuit after the threshold filter, the level of an interference wave is reduced before despreading and the S/N ratio after the despreading is further improved. With this configuration, it is not required to match the frequency of the magnetostatic-wave filter with that of the despreader. Thus, any magnetostatic-wave filter and any despreader which are usable at various frequencies can be used. In addition, with the use of a frequency conversion circuit, the magnetostatic-wave filter can be used at high frequencies, at which the filter has superior saturation characteristics.

Other features and advantages of the present invention will become apparent from the following description of embodiments of the invention which refers to the accompanying drawings.

DESCRIPTION OF EMBODIMENTS OF THE INVENTION

Figure 1:
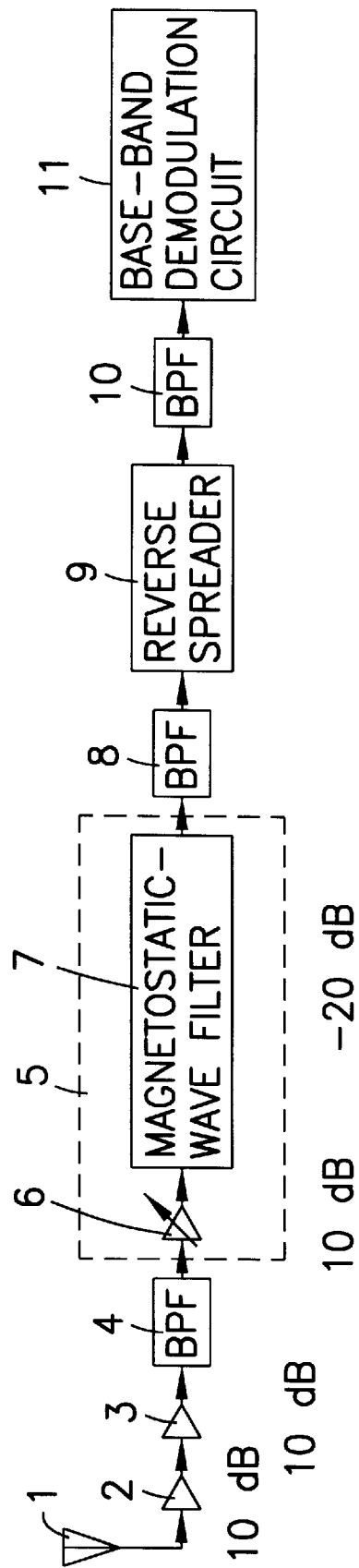
FIG. 1 is a circuit block diagram of a spread-spectrum communication apparatus according to a first embodiment of the present invention.

Embodiments of the present invention will be described below by referring to the drawings.

FIG. 1 is a circuit block diagram of a spread-spectrum communication apparatus according to a first embodiment of the present invention. In FIG. 1, there is shown a receiving antenna 1 and wide-band amplifiers 2 and 3, each having a power gain of 10 dB. A band-pass filter (BPF) 4 has a transmission band of at least 370 MHz to 430 MHz, which corresponds to the frequency band of a spread-spectrum signal. A threshold filter circuit 5 has a frequency band width covering the spectrum-signal band width and reduces interference waves having a certain level or more. It includes an AGC amplifier 6 and a magnetostatic-wave filter 7.

Figure 3:
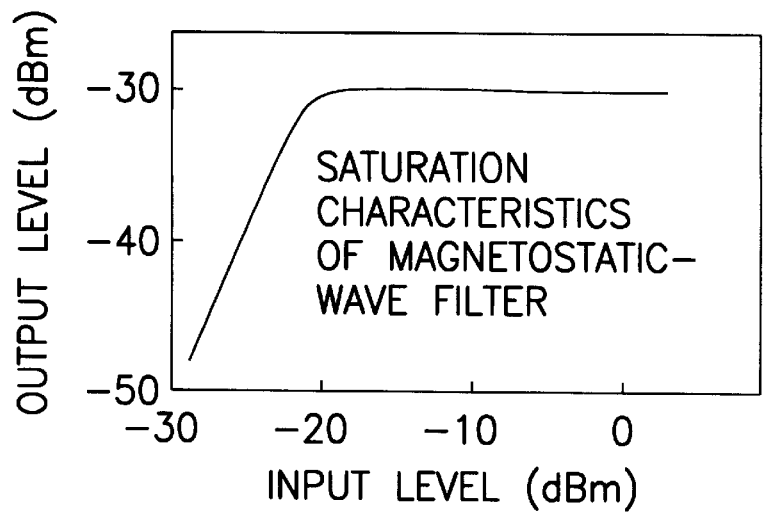
FIG. 3 is a saturation characteristic chart of a magnetostatic-wave filter used in the present invention.

The magnetostatic-wave filter 7 is saturated at an input level of −20 dB at each frequency and hence removes input power existing at more than that level, as shown in FIG. 3. A signal sustains a loss of, for example, −10 dB when it passes through the magnetostatic-wave filter.

The AGC amplifier 6 connected in series before the magnetostatic-wave filter 7 amplifies (a gain of 10 dB in this case) the level of a signal until the output of the magnetostatic-wave filter 7 is saturated. A band-pass filter (BPF) 8 functionally operates in the same way as the band-pass filter (BPF) 4. A despreader 9 is made up of a matched filter, for example, and corresponds to [6, 1] in a pseudo-noise-code m series having a code length of 63. A band-pass filter (BPF) 10 shapes a signal demodulated by the despreader 9. A base-band demodulation circuit 11 recovers a signal by conventional AM detection, FM detection, phase detection, or the like.

Figure 4:
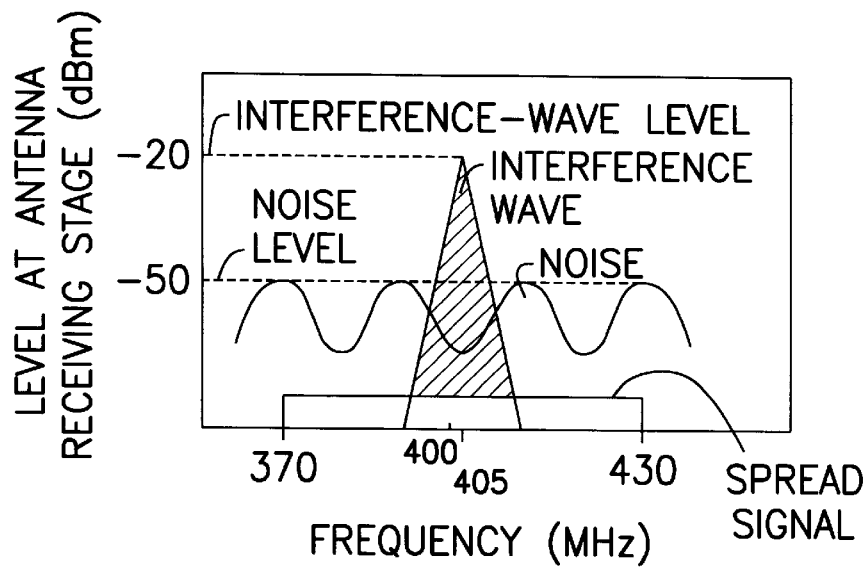
FIG. 4 is a chart indicating the levels of an interference wave and a noise signal at an antenna-receiving stage in the first embodiment of the present invention.

Operation of the circuit according to the present embodiment will be described below. As shown in FIG. 4, an interference wave having a center frequency of 405 MHz is superimposed on a spread-spectrum wave having a center frequency of 400 MHz and a spread-signal band of 370 MHz to 430 MHz. The interference wave has a level of −20 dBm. The spread signal has a level equal to or less than a noise level of −50 dBm. When the wave in which the spread-spectrum radio wave and the interference save are mixed is received by the receiving antenna 1, it is amplified by the wide-band amplifiers 2 and 3, each having a gain of 10 dB, passes through the band-pass filter 4, and is input to the threshold filter circuit 5.

Figure 5:
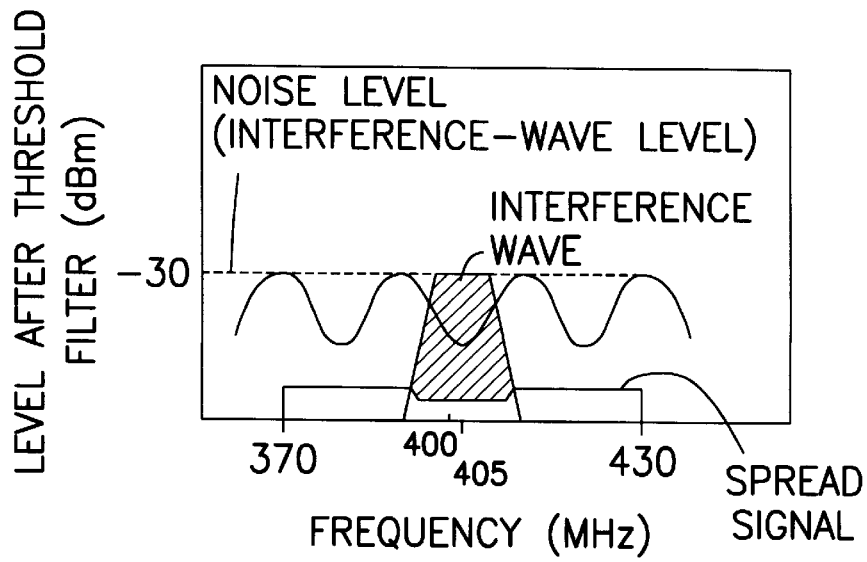
FIG. 5 is a chart indicating the levels of the interference wave and the noise signal after a threshold filter in the first embodiment of the present invention.

When the mixed wave passes through the AGC amplifier 6 having a gain of 10 dB, the level of the interference wave becomes 10 dBm and the noise level becomes −20 dBm. The mixed wave, which has been amplified by a total of 30 dBm after it was input into the antenna, is input to the magnetostatic-wave filter. The filter has the saturation characteristics shown in FIG. 3 at each frequency. The output level is saturated when the input level reaches about −20 dBm. With a loss of −10 dB due to passing-through being considered, the saturated output level is nearly −30 dBm. Therefore, the mixed wave has the level shown in FIG. 5 after the wave passes through the magnetostatic-wave filter 7 (threshold filter 5). The maximum level of the mixed wave, which includes the levels of the interference wave and noise (including the spread signal), is −30 dBm.

Figure 6:
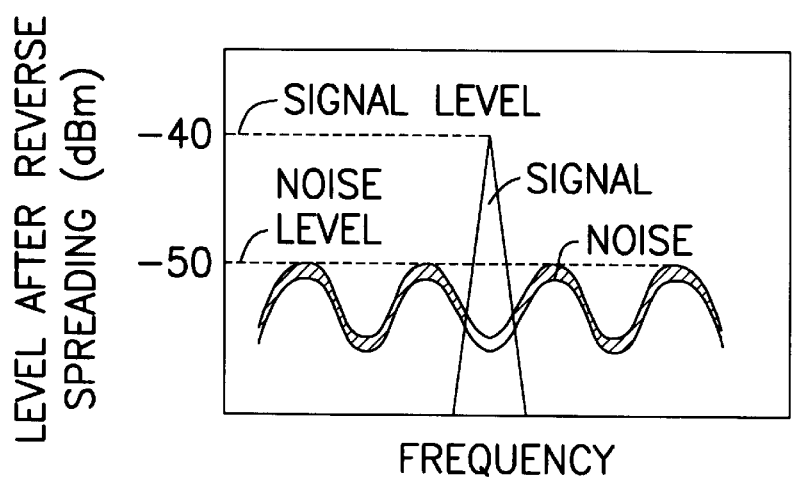
FIG. 6 is a chart indicating the levels of the interference wave and the noise signal after despreading in the first embodiment of the present invention.

When the mixed wave passes through the band-pass filter (BPF) 8 and is input to the despreader 9, the spread signal is spread in reverse with a loss of about −20 dB. The signal has a level of −40 dBm, which differentiates from the noise level of −50 dBm, and the S/N ratio is 20 dB, as shown in FIG. 6.

Figure 7:
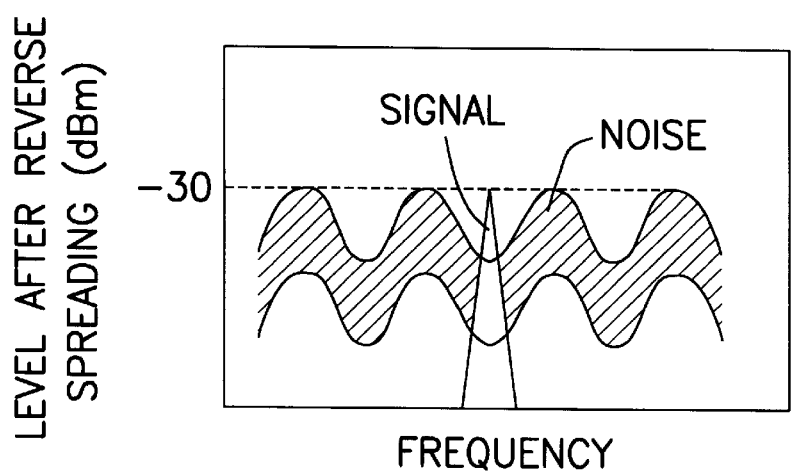
FIG. 7 is a chart indicating levels after despreading in a conventional case where a threshold filter is not used.

FIG. 7 shows S/N characteristics in a case in which the threshold filter circuit 5 is not used. Compared with a case in which the threshold filter circuit 5 is used as shown in FIG. 6, the noise level is increased by about 10 dB against the signal level.

Figure 2:
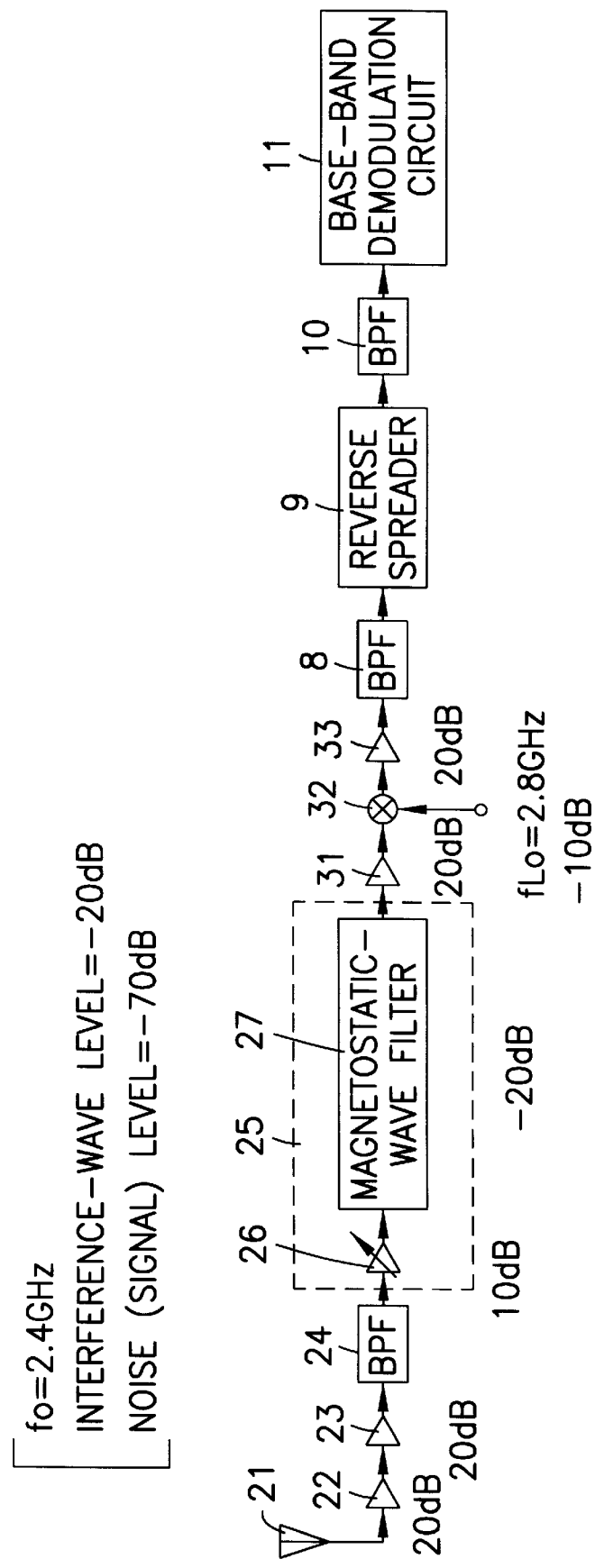
FIG. 2 is a circuit block diagram of a spread-spectrum communication apparatus according to a second embodiment of the present invention.

Referring now to FIG. 2, a spread-spectrum communication apparatus according to a second embodiment of the present invention will be described. In the circuit of this apparatus, between the threshold filter circuit 5 and the band-pass filter (BPF) 8 in the first-embodiment circuit shown in FIG. 1, a wide-band amplifier 31, a frequency converter 32, and an intermediate-frequency amplifier 33 are added as shown in FIG. 2.

Figure 8:
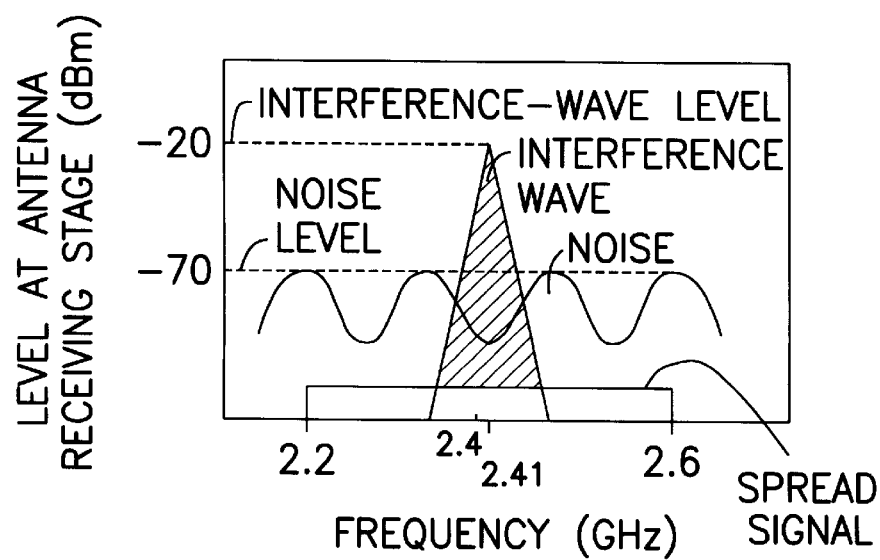
FIG. 8 is a chart indicating the levels of an interference wave and a noise signal at an antenna-receiving stage in the second embodiment of the present invention.

Operation of the circuit will be roughly described below. As shown in FIGS. 2 and 8, an interference wave having a center frequency of 2.41 GHz is superimposed on a spread-spectrum wave having a center frequency of 2.4 GHz and a spread-signal band of 2.2 GHz to 2.6 GHz. The interference wave has a level of −20 dBm. The spread signal has a level equal to or less than a noise level of −70 dBm. When the wave in which the spread-spectrum radio wave and the interference wave are mixed is received by the receiving antenna 21, it is amplified by the wide-band amplifiers 22 and 23 each having a gain of 20 dB, passes through a band-pass filter 24, and is input to a threshold filter circuit 25.

When the mixed wave passes through an AGC amplifier 26 having a gain of 10 dB, the level of the interference wave becomes 30 dBm and the noise (including the signal) level becomes −20 dBm. The mixed wave, which has been amplified a total of 50 dB after it was input into an antenna, is input to a magnetostatic-wave filter 27. Since this filter has a saturation output level of about −20 dBm, the mixed wave has a level of −30 dBm, which is the result of adding the interference level and the noise (including the signal) level, after the wave passes through the magnetostatic-wave filter 27 (threshold filter 25).

The mixed wave output from the threshold filter 25 is amplified by 20 dB in the wide-band amplifier 31 and is input to the frequency converter 32. A signal having a local-oscillation frequency fLO of 2.8 GHz and a level of −10 dBm is input to the frequency converter 32, is converted to a signal having an intermediate frequency of 400 MHz, is amplified by 20 dB by the amplifier 33, and then is input to the band-pass filter (BPF) 8. Since the circuit stages following the band-pass filter 8 are the same as those described in the first embodiment, the same numbers are used to indicate them and the descriptions thereof are omitted.

The circuit shown in the second embodiment is especially useful in cases where the spread-signal frequency band is wide, and a high carrier frequency and large spread-code coefficients are used. It also benefits from the advantage that the magnetostatic-wave filter is able to be used in a high-frequency band, in which the filter exhibits better characteristics.

Although the present invention has been described in relation to particular embodiments thereof, many other variations and modifications and other uses will become apparent to those skilled in the art. Therefore, the present invention is not limited by the specific disclosure herein.

What is claimed is:

1. A spread-spectrum communicating apparatus comprising:
    an input circuit having an output;
    a magnetostatic wave device connected to said output of said input circuit and having an output; and
    a despreader connected to said output of said magnetostatic wave device;
    wherein said input circuit comprises an amplifier having first and second amplifier circuits connected in series, said amplifier having a predetermined gain sufficient for amplifying a spread signal received by said input circuit to a level at which an output level of said magnetostatic wave device is saturated, said amplifier forwarding the amplified spread signal to said magnetostatic wave device.

2. A spread spectrum communicating apparatus according to claim 1, wherein said input circuit further comprises a bandpass filter connected in series between said first and second amplifiers.

3. A spread spectrum communicating apparatus according to claim 1, wherein said input circuit includes a bandpass filter.

4. A spread spectrum communicating apparatus according to claim 1 further comprising:
    a frequency converter disposed between said magnetostatic wave device and said despreader, for converting a frequency of a signal output from said magnetostatic wave device before the signal is processed in said despreader.

5. A spread spectrum communicating apparatus according to claim 4, wherein said frequency converter includes a mixer and at least one amplifier connected in series.

6. A spread spectrum communicating apparatus according to claim 5, wherein said frequency converter includes a mixer and a pair of amplifiers connected in series.

7. A spread spectrum communicating apparatus according to claim 6, wherein said mixer is connected in series between said pair of amplifiers.

8. A spread spectrum communicating apparatus according to claim 4, wherein said input circuit further comprises a bandpass filter connected in series between said first and second amplifiers.

9. A spread spectrum communicating apparatus according to claim 4, wherein said input circuit includes a bandpass filter.

* * * * *